Feb. 6, 1973  F. BESTENREINER  3,715,154
THREE-DIMENSIONAL PICTURE PROJECTION
Filed March 9, 1971  3 Sheets-Sheet 1

INVENTOR
FRIEDRICH BESTENREINER
BY
Attorney

Feb. 6, 1973   F. BESTENREINER   3,715,154
THREE-DIMENSIONAL PICTURE PROJECTION
Filed March 9, 1971   3 Sheets-Sheet 2

INVENTOR
FRIEDRICH BESTENREINER

BY *Adam C. Stark*
Attorney

United States Patent Office 3,715,154
Patented Feb. 6, 1973

3,715,154
THREE-DIMENSIONAL PICTURE PROJECTION
Friedrich Bestenreiner, Grunwald, Germany, assignor to Agfa-Gevaert Aktiengesellschaft, Leverkusen, Germany
Filed Mar. 9, 1971, Ser. No. 122,449
Claims priority, application Germany, Mar. 11, 1970, P 20 11 417.4
Int. Cl. G03b 35/20
U.S. Cl. 352—61                                14 Claims

ABSTRACT OF THE DISCLOSURE

A projection screen for use in three-dimensional projection systems wherein two discrete projectors project spaced apart images of a scene to be viewed has a flat arrangement of discrete records of first and second viewing zones from which the screen is to be viewed by the right and left eyes of persons in the audience. The impingement of images from the first and second projectors is respectively confined onto the records of the first and second viewing zones. The arrangement of records is a set of holograms or an integram and the confining means comprises polarizing and/or color filters, rasters of lenticules, or lasers and a set of adjustable mirrors.

BACKGROUND OF THE INVENTION

The present invention relates to improvements in the projection of three-dimensional pictures. More particularly, the invention relates to improvements in projection systems, employing a projection screen and pairs of projectors, which insure that the screen presents to the left eye of every observer in the audience a different view of a spatial scene from that seen by the right eye. Still more particularly, the invention relates to improvements in photographically prepared projection screens which are capable of presenting multiple images of each projector aperture in a system of so-called viewing zones, one for each eye of each member of the audience, whereby the spatial relationship of viewing zones with reference to the projectors remains unchanged.

In presently known screens for the projection of three-dimensional pictures, the reflecting surface is provided on a so-called "deep" hologram or Lippmann hologram having a thickness equal to a plurality of wavelengths and consisting of a system of stratified layers of scattering centers which are normal to the direction of incident light. Such "deep" holograms produce a color selective and a direction selective effect, as concerns the amounts of reflected light. If the positions of the viewing zones and of the projectors are exposed on the projection screen on a proper scale, the light issuing from the projectors is observable only in the respective viewing zones. The light is not visible in the remaining zones of the theater because the corresponding parts of light are not reflected but are free to pass through the screen.

A drawback of the just described "deep" holograms is that their manufacturing cost is extremely high and also that, due to their color selectivity, the exposure must be repeated for each of the desired colors. In other words, the various color-reflecting strips of the hologram must be stacked next to each other. Additional problems arise in connection with the screen portions which are intended to reflect green and blue colors because the efficiency of holographic emulsions for such colors is very low.

SUMMARY OF THE INVENTION

An object of the invention is to provide a screen for the projection of three-dimensional pictures which need not embody a "deep" hologram.

Another object of the invention is to provide a novel and improved method of preparing screens for the projection of three-dimensional pictures.

A further object of the invention is to provide a projection screen for a three-dimensional projection system which can be mass-produced at a reasonable cost.

An additional object of the invention is to provide a projection screen which can be used for projection of three-dimensional pictures to smaller or larger audiences in theaters of any desired practical size.

Another object is to provide a three-dimensional projection system which utilizes the improved screen.

Still another object of the invention is to provide a three-dimensional projection system wherein a substantial percentage of light issuing from the projectors can reach the eyes of the observers.

The invention is embodied in a three-dimensional projection system which comprises first and second projector means for projecting spaced apart images of a scene to be viewed, and more particularly in a projection screen which is positioned to be impinged by the images from the first and second projector means and has a substantially flat arrangement of discrete records of first and second viewing zones from which the screen is to be respectively viewed by the right and left eyes of the observers. The screen further comprises or cooperates with confining means for respectively restricting the impingement of images from first and second projector means onto the records of the first and second viewing zones.

The confining means may comprise lasers and movable optical elements, polarizing filters, color filters or rasters of lenticules, and the arrangement of records may constitute a set of holograms or an integram.

The novel features which are considered as characteristic of the invention are set forth in particular in the appended claims. The improved projection screen itself, however, both as to its construction and the mode of making and using the same, together with additional features and advantages thereof, will be best understood upon perusal of the following detailed description of certain embodiments with reference to the accompanying drawing.

DESCRIPTION OF THE PREFERRED EMBODIMENTS

Figure 1:
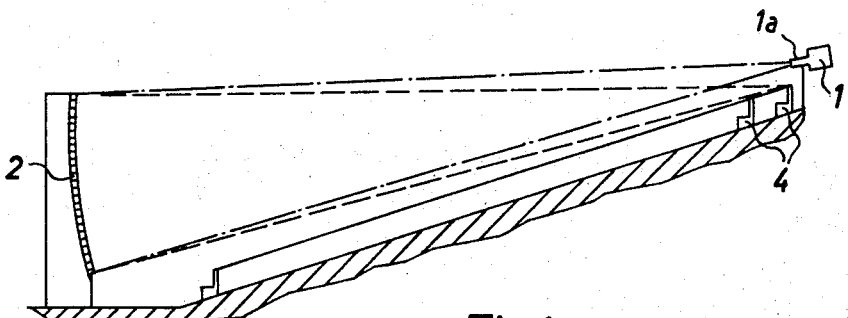
FIG. 1 is a diagrammatic longitudinal vertical sectional view of a theater, further showing a three-dimensional projection system with two projectors and a projection screen which embodies the invention.

FIG. 1 is a longitudinal vertical sectional view of a theater structure. The projection screen is shown at 2 and the two projectors which are transversely aligned with each other (see FIG. 2) are shown at 1 and 3. Each of the projectors 1, 3 projects onto the concave front surface of the screen 2 one of a pair of spaced apart images of the scene to be viewed. The theater structure accommodates rows of seats 4 for the audience. The seats 4 are distributed practically over the entire area which is enclosed by the theater structure; however, the front seats should not be placed too close to the screen 2.

Figure 2:
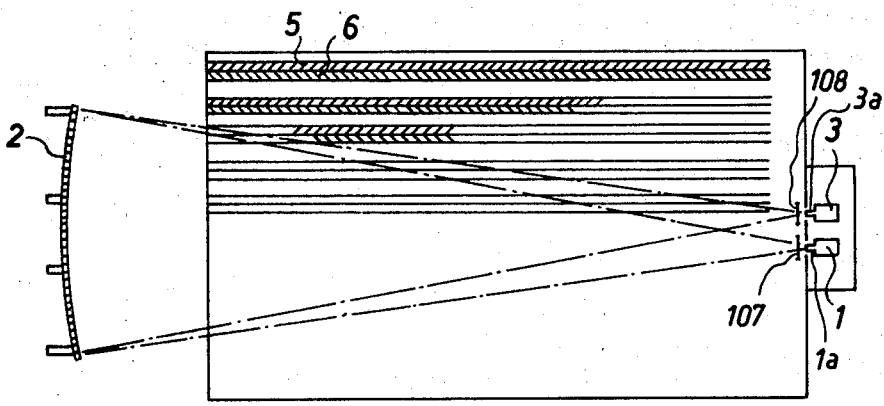
FIG. 2 is a plan view of the theater, showing the viewing zones to which the screen projects.

FIG. 2 shows the aforementioned viewing zones which are narrow strips extending lengthwise of the audience area and close to the central planes of the respective rows of seats 4. Each pair of viewing zones has a width of about 70 millimeters (normal eye spacing), and each such pair includes a "right" viewing zone 5 and a "left" viewing zone 6. The screen 2 is constructed in such a way that light issuing from the objective 3a of the projector 3 can be seen only in the viewing zones 5 (by the right eyes of the viewers) and that light issuing from the objective 1a of the projector 1 can be seen only in the viewing zones 6 (by the left eyes of the observers). Otherwise stated, when the head of a person occupying a seat 4 is situated in such position that the right eye is in the corresponding viewing zone 5 and the left eye is in the corresponding viewing zone 6, each eye will see a separate image projected by the projector 3 or 1 and reflected by the records of viewing zones 5, 6 on the screen 2. The right eye will not see any light issuing from the projector 1, and the left eye will not see any light issuing from the projector 3. A detailed explanation of the just discussed viewing zones and of the extent to which the impression of a three-dimensional picture is created when the right and left eyes are situated in the "wrong" viewing zones (6 and 5, respectively) can be found in the article entitled "Three Dimensional Cinema" on pages 141–145 of the July 14, 1960 edition of "The New Scientist."

Figure 3:
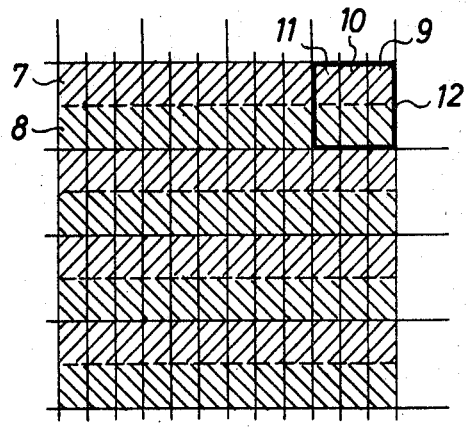
FIG. 3 is a fragmentary diagrammatic front elevational view of a projection screen which embodies one form of the invention and wherein the records of the viewing zones are holograms.

FIG. 3 illustrates a first embodiment of the improved projection screen, namely, a portion of an arrangement of "flat" records or sets of holograms of the viewing zones 5, 6 which can form part of the screen 2 shown in FIGS. 1 and 2. The arrangement of records is overlapped by small strips of polarizing filters 7, 8 whose directions of polarization are inclined with reference to each other at an angle of 90 degrees. The filters 7, 8 are overlapped by narrow strips 9, 10, 11 of color filters in the additive basic colors blue, green and red. The block 12 which is surrounded by heavy lines contains six records of the viewing zones 5, 6 overlapped by two strips 7, 8 and three strips 9, 10, 11. The strips 7, 8 are parallel to each other and normal to the strips 9, 10, 11. Thus, the block 12 contains a point of the picture in the three colors and for both eyes of the viewers. The block 12 should not be too large; its dimensions should be selected in such a way that it remains unresolvable by the eyes of persons sitting nearest to the screen 2.

Figure 6:
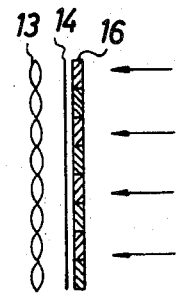
FIG. 6 illustrates an integram which can be used in a projection screen to be illuminated from the rear.
Figure 8:
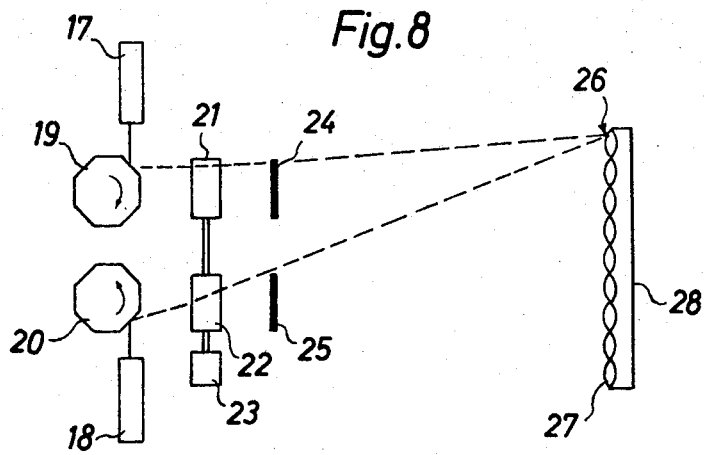
FIG. 8 illustrates a system for projection of three-dimensional pictures without resorting to polarizing or color filters.

The procedure of making the "flat" records of viewing zones behind the strips 7–11 of FIG. 3 is as follows: In the first step, one exposes on a photosensitive medium the images of the viewing zones for the right eyes and thereupon the images of the viewing zones for the left eyes. To this end, the viewing zones can be represented by luminous bodies in full size. If the dimensions of the viewing zones exceed the coherency length of the light source, one resorts to smaller-scale models which are illuminated by laser, for example, in a manner as shown in FIGS. 6 and 8 of Pat. 3,479,111 to Gabor. Thus, the reference beam can be caused to form an image at the actual relative position of the respective projector 1 or 3, i.e., at the position of the aperture of such projector. The records are made on elongated portions or strips of photosensitive material, which are covered by narrow diaphragm strips, in such a way that regions with recordings of the viewing zones for the left eyes alternate with regions of recordings of the viewing zones for the right eyes but with a sufficient degree of fineness.

When the development of the thus exposed photosensitive material is completed and the resulting arrangement of records is provided with the strips 7, 8 and 9–11, the projectors 1, 3 are placed in appropriate positions with reference to the finished screen 2. The light issuing from the projector 3 is reflected in such a way that it enters only the viewing zones 5, and the light issuing from the other projector 1 is reflected in such a way that it enters only the viewing zones 6. The laws which govern such behavior of light are well known. There is no reconstruction in the other zones of the theater, i.e., such other zones remain dark. Since the discrete strips of holograms are covered by the polarizing filter strips 7, 8, and since corresponding polarizing filters 107, 108 (see FIG. 2) are also placed in front of the objectives 1a, 3a of the projectors 1, 3, the left eyes of persons in the audience can only see light issuing from the projector 1, and the right eyes can see only such light which issues from the projector 3.

The fact that the projectors 1, 3 furnish white light rather than coherent light which is customarily employed in holography does not unduly affect the quality of reproduction because the diffraction of various colors by the holograms is not uniform. The marginal portions of the records of viewing zones exhibit color shifts which are not seen if the eyes of a person in the audience are moved into the centers of the respective viewing zones.

The components 7, 8, 9, 10, 11, 107, 108 together constitute a confining means which respectively restricts the impingement of images from the projectors 1 and 3 onto the records or holograms of the first and second viewing zones. This insures that the eyes of each person in the audience will see two discrete images of the scene to be viewed.

For the projection of images in color, the exposure of viewing zones on photosensitive material must be repeated for each of the strips 9, 10 and 11 shown in FIG. 3 by resorting to a laser which emits light in the respective colors. During the projection, a region composed of the upper blue, green and red filters of the block 12 shown in FIG. 3 reflects one spot of the image into one of the eyes, and the region including the lower blue, green and red fields of the block 12 reflects one spot of the image into the other eye. A pair of stereo images is built up of a plurality of such spots whereby each eye sees only one image of the pair. If the eyes of an observer are located in the proper viewing zone, the observer sees an orthoscopic image without being compelled to resort to selective optical aids, such as colored or polarizing spectacles.

Figure 9:
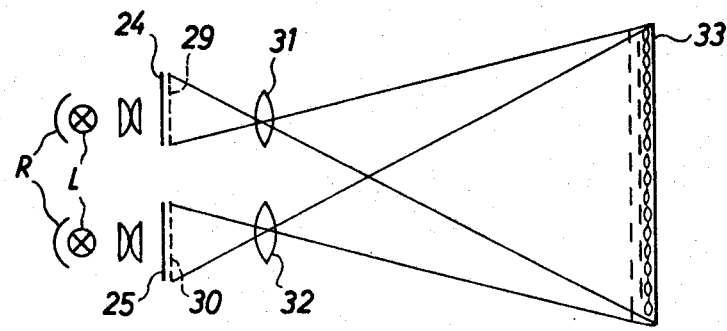
FIG. 9 illustrates another system for the projection of three-dimensional pictures without polarizing filters.

The polarizing filters 107, 108 in front of the objectives of the projectors and the polarizing filters 7, 8 can be omitted by placing diaphragm rasters 29, 30 into the film planes of the projectors as shown in FIG. 9. The objectives of the two projectors are shown at 31, 32 and the film planes at 24, 25. The projection lamps L are located in front of reflectors R. The images of films in the planes 24, 25 are projected by objectives 31, 32 onto the corresponding strips of lenticules forming a raster of the modified projection screen 33. The strips of images projected by the objective 31 reach the records of the left viewing zones and the strips of images projected by the objective 32 reach the records of the right viewing zones. The records of the two sets of viewing zones are immediately adjacent to each other.

A drawback of the use of holograms for presently known projection screens is that, due to diffraction, only a small portion of the light emitted by the projector can be used for observation of three-dimensional pictures. The efficiency is particularly low when the screen is used for the reconstruction of pairs of colored pictures because only one-sixth of the screen is available for reflection of light in one color into the respective eye. Thus, the light efficiency is but a small fraction of the light efficiency of conventional screens.

Figure 4:
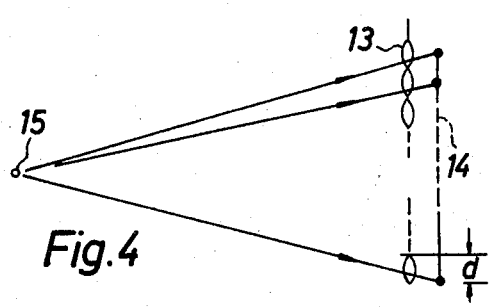
FIG. 4 illustrates apparatus for the making of an integram of the records of viewing zones.

Such drawback (unsatisfactory light efficiency due to division of colors) can be avoided in accordance with the present invention by utilizing a projection screen having an arrangement of records of viewing zones in the form of an integram which can be produced in a manner as shown in FIG. 4. The integral photography system of FIG. 4 employs a raster of lenticules 13 which are located in a common plane. The raster is located in front of an image plane 14 which coincides with the focal planes of the lenticules 13. The diameters of the lenticules 13 are too small to be resolved by the eyes of viewers in the front row of the theater. One spot 15 of the object is imaged in the plane 14 by each of the lenticules 13 but with a certain degree of defocussing corresponding to the finiteness of the distance between the spot 15 and the raster. The images are exposed onto a photographic plate which is placed into the plane 14 and is thereupon developed by a reversal process. Each area or section of the developed plate which corresponds to one lenticule 13 of the raster carries a positive record of the spot 15. If the spot 15 is replaced with a scale model of the viewing zones, each section of the developed plate carries a record of a full image of the viewing zones but in a different perspective from section to section.

Figure 5:
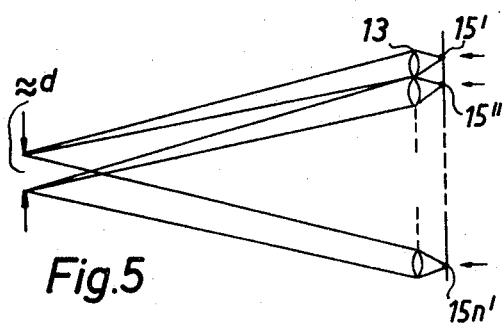
FIG. 5 illustrates one mode of utilizing the integram which is obtained by resorting to the apparatus of FIG. 4.

If the developed plate is thereupon placed behind a raster of lenticules 13 similar to those shown in FIG. 4 so that the plane of the plate coincides with the focal planes of the lenticules (see FIG. 5) and is illuminated from the rear by diffused light, the sections 15', 15'' . . . 15$^{n'}$ which correspond to the spot 15 are imaged in the infinity as bundles of parallel light rays. The diameters $d$ of the bundles correspond to the diameter of a lenticule 13, and the bundles intersect each other in the point 15 to build up a quasi-real aerial image of the spot. If the rows of lenticules 13 in the raster are provided with alternating first and second strips of polarizing filters each having a width which equals the diameter $d$ of a lenticule 13 and wherein the direction of polarization of first filters differs from that of the second filters, the right and left viewing zones can be reproduced separately from each other. A separate reproduction of the two viewing zones can also be obtained by resorting to the diaphragm rasters 29, 30 of FIG. 9 which are located in the film planes of the respective projectors. A viewing zone integram for relatively small theaters or audiovisual apparatus can be produced at the full-size scale of one-to-one. For this purpose, the viewing zones are formed as luminescent bands, such as fluorescent tubes, or as discrete luminescent points such as incandescent lamps. The exposure is made in a manner as shown in FIG. 4.

If the screen is to be used in theaters of different sizes, one can resort to a smaller-scale model of the viewing zones. One produces a virtual image of the viewing zones. It was found that, when the screen is to be produced in substantial quantities, it is desirable to produce quasi-photographic records of views taken at different angles by resorting to a conventional electronic data processing system. Such a synthetic hologram or integram exhibits only two shades, namely a light and a dark shade, and is especially suited for use in a screen in theaters of varying size. The integram can be reproduced by resorting to conventional printing techniques at a low cost per individual reproduction. Another advantage of such integrams is that the defects of lenticules, especially aberration, have no effect on the exposures. The printing techniques which are suited for mass-reproduction of such fine exposures can be the same as those resorted to for the production of three-dimensional cards. It is also well known to laminate such reproductions with rasters of lenticules in requisite positions with reference to each other.

One mode of utilizing a projection screen having an integram of records of viewing zones is shown in FIG. 6. The screen of FIG. 6 is designed for illumination from the rear. The light issuing from both projectors is propagated in the direction indicated by arrows and passes through a raster 16 of polarizing filters, thereupon through an integram 14 and finally through a raster of lenticules 13 before it reaches the eyes of the viewers. The eyes of the viewers see only such light which passes through the light-transmitting regions of the integram. The combination of integram 14 with the filter raster 16 insures that each eye of each observer sees only the light issuing from the respective projector. The objectives of the projectors are located behind polarizing filters (107, 108 in FIG. 2) and the eyes receive only such light which passes through those filters of the raster 16 that correspond to the filter in front of the respective projector. There should be no overlapping of the viewing zones in the space (to the left of the raster 13 of FIG. 6) which accommodates the seats for the audience.

Figure 7:
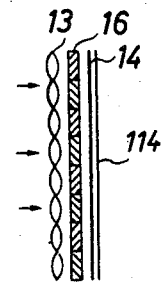
FIG. 7 illustrates a projection screen employing the integram of FIG. 6 but being used for illumination by projectors located in front of the screen.

The projection screen of FIG. 7 is especially suited for use in large theaters. The audience is assumed to be seated to the left of the integram 14 and the light issuing from the two projectors passes first through a raster of lenticules 13, thereupon through a raster 16 of polarizing filters and is partially reflected on the integram 14. The latter is constructed in such a way that the light which should not reach the viewing zones is absorbed by a black protective layer 114 behind the integram. The remaining light is reflected by those areas of the integram 14 which correspond to the viewing zones and is caused to pass through the lenticules 13 into the respective viewing zones. The raster 16 insures that alternate rows of lenticules receive reflected light which has issued from the corresponding projectors.

Referring finally to FIG. 8, there is shown a system which can carry out a different projection method without resorting to polarizing filters. The numerals 17 and 18 denote two lasers which, when used for projection of color images, are designed to emit light in any one of the desired colors. The light beams issuing from the lasers 17, 18 are reflected on the facets of rotating polygonal mirrors 19, 20 and on pivotable or swingable mirrors 21, 22 which are moved by a servomotor 23. The beams illuminate successive spots of the corresponding pair of pictures 24, 25. The arrangement is such that the laser beams project the shadows of the images 24, 25 onto the screen 26. This is due to deflection of such beams and to the selected distance of lasers 17, 18 from the screen. The latter comprises a raster of lenticules 27 and an integram 28 of records of viewing zones. The plane of the integram 28 coincides with the focal planes of the lenticules 27. The records of viewing zones on the integram 28 are compartmentized or boxed into each other in such a way that one set of rows of lenticules 27 directs one of a pair of images into one group of viewing zones in the theater and the other set of rows of lenticules 27 directs the second image into the other group of viewing zones. The rows of the two sets of rows of lenticules 27 preferably alternate with each other. The diameters of the laser beams and the amplitudes of the angular movements of optical elements 19–22 are selected in such a way that the pairs of images 24, 25 are scanned without any gaps but that the intensity-modulated beams impinge only on the corresponding rows of the lenticules 27. This insures that the pairs of images 24, 25 can be seen only by those observers whose eyes are located in the appropriate viewing zones. Thus, if an observer is properly seated, his or her eyes will see an orthoscopic three-dimensional image.

It is clear that the pairs of still pictures 24, 25 can be replaced by two moving strips of images. The two strips must be moved in synchronism so that the laser beams invariably scan pairs of images of identical scenes or subjects but taken at different angles.

An important advantage of a flat arrangement of records of the viewing zones, as contrasted with a deep hologram, is that the flat arrangement can be mass-produced by printing or by shaping of synthetic plastic material. Thus, the aforementioned holograms (FIG. 3) and integrams (FIGS. 4–8) can be produced at a fraction of the cost of a deep hologram. The information which is recorded on such arrangements is located in a plane. Also, when the screen employs an integram, the projectors need not be provided with sources of coherent light. The confining means may include polarizing filters or color filters (see FIGS. 2 and 3), rasters in the film planes of projectors (see FIG. 9) or moving optical elements and sources of coherent light (see FIG. 8).

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. For use in a three-dimensional projection system wherein first and second projector means project spaced apart images of a scene to be viewed, a projection screen positioned to be impinged by the images from the first and second projector means, said screen comprising a two-dimensional photographic reproduction of an original flat hologram of discrete records of first and second viewing zones from which the screen is to be respectively viewed by the right and left eyes of observers, and confining means for respectively restricting the impingement of images from the first and second projector means onto the reproductions of the records of said first and second viewing zones.

2. A screen as defined in claim 1, wherein said confining means is located in the region of the first and second projector means and comprises sources of coherent light.

3. A screen as defined in claim 1, wherein said confining means comprises polarizing filters located in front of said reproduction and in front of the objectives of the first and second projector means.

4. A screen as defined in claim 1, wherein said confining means comprises color filters positioned in front of said reproduction and in front of the objectives of the first and second projector means.

5. A screen as defined in claim 1, wherein said confining means comprises diaphragm rasters positioned in the film planes of the first and second projector means.

6. A screen as defined in claim 1, wherein said records form an integram which is produced in accordance with a quasi-photographic process.

7. A screen as defined in claim 1, wherein said discrete records are holograms, said confining means comprising first polarizing filters positioned in front of the objectives of the first and second projector means and second polarizing filters positioned in front of said last mentioned holograms, the projector means occupying the positions of reference light sources for said last mentioned holograms.

8. A screen as defined in claim 7, wherein said last mentioned holograms and said second polarizing filters are in the form of strips.

9. A screen as defined in claim 1, wherein each of said records comprises a set of strip-shaped holograms and said confining means comprises differently colored color filters each registering with a different strip of each set of strip-shaped holograms.

10. A screen as defined in claim 1, wherein said discrete records constitute an integram.

11. A screen as defined in claim 10, wherein said confining means comprises a raster of lenticules and polarizing filters registering with said raster.

12. A screen as defined in claim 11, wherein each of said lenticules registers with one of said records and said filters include a first set of filters and a second set of filters respectively overlying those lenticules which respectively register with the records of said first and second viewing zones.

13. A screen as defined in claim 1, wherein said records are photomechanical reproductions of a photographically produced integram.

14. In a three-dimensional projection system, the combination of first and second projector means for projecting spaced apart images of a scene to be viewed, a projection screen positioned to be impinged by the images from the first and second projector means and comprising a two-dimensional photographic reproduction of an original flat hologram of discrete records of first and second viewing zones from which the screen is to be respectively viewed by the right and left eyes of observers, and confining means for respectively restricting the impingement of images from said first and second projector means onto the reproductions of the records of said first and second viewing zones.

References Cited

UNITED STATES PATENTS

| 3,479,111 | 11/1969 | Gabor | 352—44 |
| 2,218,875 | 10/1940 | Parsell | 352—43 |

SAMUEL S. MATTHEWS, Primary Examiner

M. H. HAYES, Assistant Examiner

U.S. Cl. X.R.

350—117, 129; 352—38, 43, 81